United States Patent
Bertsch et al.

(10) Patent No.: US 11,275,333 B2
(45) Date of Patent: Mar. 15, 2022

(54) METHOD FOR PRODUCING A COMPONENT AND MANUFACTURING DEVICE

(71) Applicant: Robert Bosch GmbH, Stuttgart (DE)

(72) Inventors: Benjamin Bertsch, Lichtenstein (DE); Florian Fischer, Hirschberg an der Bergstrasse (DE); Lukas Loeber, Ludwigsburg (DE); Martin Schoepf, Stuttgart (DE); Michael Walther, Renningen (DE); Thorsten Heeling, Stuttgart (DE); Arne Stephen Fischer, Leinfelden-Echterdingen (DE)

(73) Assignee: Robert Bosch GmbH, Stuttgart (DE)

(*) Notice: Subject to any disclaimer, the term of this patent is extended or adjusted under 35 U.S.C. 154(b) by 231 days.

(21) Appl. No.: 16/692,313

(22) Filed: Nov. 22, 2019

(65) Prior Publication Data
US 2020/0166879 A1 May 28, 2020

(30) Foreign Application Priority Data
Nov. 26, 2018 (DE) .......................... 102018220225.7

(51) Int. Cl.
| | |
|---|---|
| G03G 15/22 | (2006.01) |
| B29C 64/153 | (2017.01) |
| G03G 15/16 | (2006.01) |
| B29C 64/205 | (2017.01) |
| B33Y 80/00 | (2015.01) |

(Continued)

(52) U.S. Cl.
CPC ......... G03G 15/224 (2013.01); B29C 64/153 (2017.08); B29C 64/205 (2017.08); G03G 15/1625 (2013.01); *B33Y 10/00* (2014.12); *B33Y 30/00* (2014.12); *B33Y 70/00* (2014.12); *B33Y 80/00* (2014.12)

(58) Field of Classification Search
CPC .............. G03G 15/224; G03G 15/1625; B29C 64/153; B29C 64/205; B29C 64/165; B33Y 80/00; B33Y 10/00; B33Y 30/00; B33Y 70/00; B33Y 40/20; Y02P 10/25; B22F 10/40; B22F 10/20; B22F 10/10; B22F 3/10; B22F 1/0003; B22F 3/1021; B22F 1/02; B22F 1/0062
See application file for complete search history.

(56) References Cited

U.S. PATENT DOCUMENTS 10,913,202 B2 * 2/2021 Espalin .................. B33Y 10/00
2015/0024169 A1 1/2015 Martin
(Continued)

*Primary Examiner* — Nahida Sultana
(74) *Attorney, Agent, or Firm* — Norton Rose Fulbright US LLP; Gerard Messina

(57) ABSTRACT

A method is described for producing a component, having a first constructive step in which a support material is applied onto a bearer using a photoelectric print method in the first constructive step to form at least one auxiliary structure, the auxiliary structure having and/or forming intermediate spaces, and having a second constructive step, in which a component material is filled into the intermediate spaces using a further photoelectric print method to form a component structure, the auxiliary structure and the component structure forming a blank segment of the component, the component material being a powder, the powder including composite particles, the composite particles being formed by ceramic and/or metallic core particles that include a polymer 23.

19 Claims, 7 Drawing Sheets

(51) Int. Cl.
*B33Y 10/00* (2015.01)
*B33Y 30/00* (2015.01)
*B33Y 70/00* (2020.01)

(56) References Cited

U.S. PATENT DOCUMENTS

2018/0104741 A1* 4/2018 Heinrichsdorf ........... B22F 1/02
2018/0236557 A1* 8/2018 Garay .................. B22D 29/002

* cited by examiner

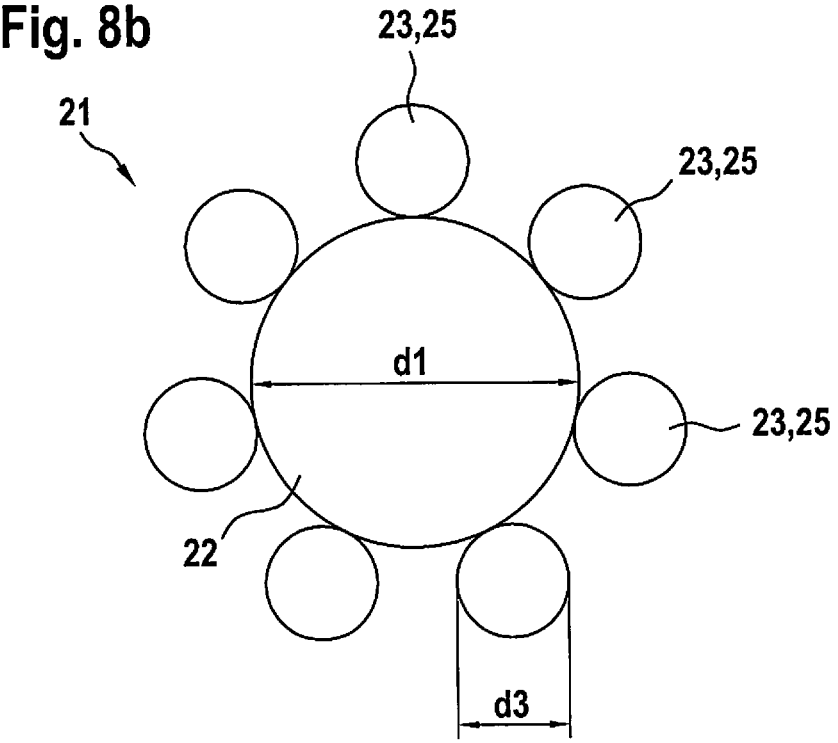
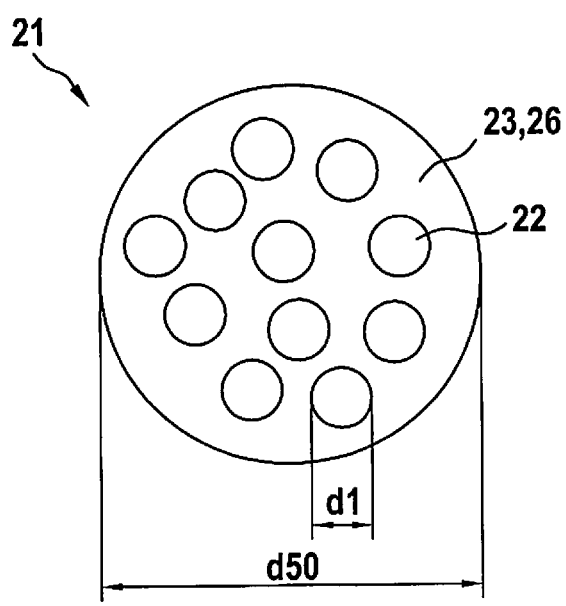

METHOD FOR PRODUCING A COMPONENT AND MANUFACTURING DEVICE

CROSS REFERENCE

The present application claims the benefit under 35 U.S.C. § 119 of German Patent Application No. DE 102018220225.7 filed on Nov. 26, 2018, which is expressly incorporated herein by reference in its entirety.

FIELD

The present invention relates to a method for producing a component. In addition, the present invention relates to a manufacturing device for producing the component.

BACKGROUND INFORMATION

Conventionally, electrophotography is used to print two-dimensional polymer-based structures on a planar substrate. Such electrophotography systems have, inter alia, a photoreceptor roller, electrostatic interaction being used, in a transfer process, to transfer a manufacturing material from the photoreceptor roller onto a bearer material in order to form the two-dimensional structure.

United States Patent Application No. US 2015/0024169 A describes a method for printing a three-dimensional component and a support structure using an additive manufacturing system based on electrophotography. The method includes the development of a support layer of the support structure from a soluble support material using a first electrophotography device, and the transfer of the developed support layer from the first electrophotography device onto a transfer medium. The method also includes the development of a component layer of the three-dimensional component from an ABS component material using a second electrophotography device, and the transfer of the developed component layer from the second electrophotography device onto the transfer medium.

SUMMARY

In accordance with the present invention, a method is provided for producing a component. In addition, a manufacturing device is provided. Preferred and/or advantageous specific embodiments are described herein and are shown in the Figures.

In accordance with the present invention, a method is provided that is suitable for producing a component. The method is, in particular, an additive manufacturing method. The method is used principally in order to produce a plurality of components, for example in industrial production. Alternatively, however, the method can be used in prototype production. Preferably, the component is realized as a metal component or as a ceramic component. Alternatively, however, the component can also be realized as a composite component, where the component can include different material segments, in particular at least one metal segment and/or at least one plastic segment and/or at least one ceramic segment. The component is in particular a three-dimensional component and has a component geometry. The component geometry can in particular be a complex geometry, for example having recesses and/or undercuts. Alternatively or optionally in addition, the component geometry can also be an extruded geometry.

The method has an optional first construction step and a second construction step. In particular, the second construction step takes place after the optional first construction step. Preferably, the second construction step can directly follow the optional first construction step; alternatively, a further step, for example a pause step or a drying step, can be provided between the optional first construction step and the second construction step.

In the optional first construction step, a support material is applied onto a bearer, and an auxiliary structure is formed. In particular, the support material is applied directly onto the bearer; alternatively or optionally in addition the auxiliary structure can be applied onto a structure already present on the bearer, such as a blank layer. In particular, the auxiliary structure is a solid and/or stable and/or non-deformable structure. The auxiliary structure is for example a three-dimensional structure and has a planar extension. The support material is preferably a plastic and/or polymer.

The application of the auxiliary structure onto the bearer takes place using a photoelectric print method. The photoelectric print method is for example an electrophotography method. The photoelectric print method is preferably carried out using a photoreceptor roller. For example, for this purpose the support material is applied onto the photoreceptor roller, the support material preferably adhering to the photoreceptor roller on the basis of an electrostatic interaction. The application of the support material onto the photoreceptor roller takes place in particular as an optical image of the auxiliary structure to be formed, the photoreceptor roller being correspondingly exposed for this purpose. Through the exposure of the photoreceptor roller in the shape of the auxiliary structure, the photoreceptor roller is for example electrically neutralized at the exposed points. The exposure of the photoreceptor roller and/or the image on the photoreceptor roller are done for example in the form of a negative of the auxiliary structure. The support material applied onto the photoreceptor roller is transferred in a transfer method, in particular in the first constructive step, onto the bearer and/or onto an already-present blank layer. The transfer of the support material from the photoreceptor roller onto the bearer preferably takes place on the basis of a further electrostatic interaction.

The auxiliary structure has intermediate spaces and/or forms intermediate spaces. The intermediate spaces are realized for example as hollow spaces and/or as material recesses. The intermediate spaces have a geometrical dimension that preferably corresponds to the component geometry of the component to be manufactured. In particular, the auxiliary structure forms a positive of the component to be constructed.

In the second constructive step, which can also be carried out without the preceding first constructive step, a component material is applied, in particular into the intermediate spaces, and forms a component structure of the component. The application of the component material, in particular into the intermediate spaces, takes place in a further photoelectric print method. In particular, the application of the component material is done using electrophotography. Here, for example the component material, in the form of the intermediate spaces of the auxiliary structure, is applied onto the photoreceptor roller or onto a further photoreceptor roller, the applied component material being transferred in particular into the intermediate spaces. In the second constructive step, the component material is for example transferred directly onto the bearer; alternatively, the transfer of the component material can be done onto an already-present blank layer.

Optionally in addition, the bearer can be heated, the heating improving an adhesion of the support material and/or of the component material. Alternatively, it can be provided to first apply the component material, the component material applied in this way forming intermediate spaces into which the support material is filled.

The optional auxiliary structure and the component structure together form a blank segment of the component. In particular, the blank segment is formed by a planar layer, preferably the blank layer. In particular, the optional auxiliary structure and the component structure and or the blank segment have the same layer thickness. Alternatively, however, the optional auxiliary structure and the component structure can also have different layer thicknesses.

In the context of the present invention, the component material may be realized as a powder, the powder having composite particles that are formed by ceramic and/or metallic core particles and that include a polymer. The powder can be realized as a ceramic and/or metallic powder, the polymer being mixed in as a binder and adhering to the core particles. The adhesion of the polymer to the core particles can be based on a mechanical and/or chemical bond and/or a diffusion and/or a pseudo-diffusion. The polymer is preferably realized as a non-conductive polymer, in particular as a plastic. The metallic powder in particular primarily has a metallic composition, the core particles being for example iron particles, nickel particles, aluminum particles, or titanium particles. Alternatively, the metallic powder can also be a mixture of metallic powders. The ceramic powder in particular primarily has a ceramic composition, the core particles being for example oxide ceramic particles, carbide ceramic particles, or nitride ceramic particles. Alternatively, the ceramic powder can also be a ceramic powder mixture. Preferably, the core particles have the same chemical composition as the component to be manufactured. For example, the component to be manufactured is an aluminum component, and the core particles for example also include aluminum as principal element. Specifically, the powder can also be realized as an MIM powder suitable for a metallic powder injection molding process. Alternatively, the powder can be realized as a CIM powder suitable for a ceramic injection molding process.

An aim of the present invention is to provide a method in which components such as those known from the MIM process or CIM process can be produced using electrophotography. In this way, plastic, metal, and/or ceramic components can be produced without large hardware and process parameter changes, and all three material classes can be processed on one machine. Through the use of photoelectric print methods, in particular a particularly efficient and rapid method is provided. Through the adhesion of the polymer to the core particles, the core particles are made significantly better for the electrophotography with regard to conductivity and melting point, compared to purely metallic or ceramic particles, so that the reliability of the transfer process is significantly improved.

In a possible realization of the present invention, it is provided that the polymer forms a polymer layer. The core particles can be completely coated with the polymer layer.

Particular preferably, all core particles are sheathed by the polymer layer. Alternatively, however, the core particles can also be coated with the polymer layer in segments. Specifically, here the polymer layer extends over more than 50%, preferably more than 80% of a particle surface of the respective core particle. In particular, the polymer layer has a layer thickness that is at least approximately constant. This embodiment is based on the aim of providing a method in which a component can be produced in a powder-based method, a binding of all particles being ensured by the core particles coated with the polymer layer.

In an alternative realization of the present invention, it is provided that the polymer is formed by separate polymer particles, a plurality of the polymer particles being attached to one of the core particles in each case. In particular, in each case more than one polymer particle is attached to each core particle. In principle, the polymer particles can be regularly ordered and/or configured with a uniform spacing from one another on the particle surface of the core particles. Alternatively, the polymer particles can also be irregularly ordered and/or configured non-uniformly on the particle surface of the core particles. This embodiment is based on the aim of providing a method in which a component can be produced in a powder-based method, where a binding of all the particles is likewise ensured by the adhering polymer particles.

Particularly preferably, it is provided that the core particles, in particular the core particles provided with the polymer layer and/or with the polymer particles, have an average grain diameter of greater than 1 µm, preferably greater than 10 µm, specifically greater than 20 µm. Alternatively or optionally in addition, the core particles have an average grain diameter of less than 30 µm, preferably less than 15 µm, specifically less than 5 µm. Alternatively or optionally in addition, the polymer layer has a layer thickness of greater than 1 µm, preferably greater than 3 µm, specifically greater than 7 µm. Alternatively or optionally in addition, the polymer layer has a layer thickness of less than 10 µm, preferably less than 5 µm, specifically less than 2 µm. Alternatively, the polymer particles have an average grain diameter of greater than 1 µm, preferably greater than 3 µm, specifically greater than 7 µm. Alternatively or optionally in addition, the polymer particles have an average grain diameter of less than 10 µm, preferably less than 5 µm, specifically less than 2 µm. This embodiment is based on the aim of providing a powder that is high in quality and is suitable for electrophotography.

In a further alternative realization of the present invention, it is provided that the polymer forms a polymer matrix, a plurality of the core particles being embedded in the polymer matrix. In particular, per composite particle, more than one core particle is embedded in the polymer matrix. Alternatively or optionally in addition, the composite particles have a volume portion of greater than 20%, preferably greater than 50%, specifically greater than 70% of the metallic and/or ceramic core particles. Preferably, the core particles are completely or at least partially embedded in the polymer matrix. The core particles can in principle be distributed at least approximately uniformly in the polymer matrix. This embodiment is based on the aim of providing a method that enables an easily realizable binding of particularly fine-grained core particles and the polymer.

Particularly preferably, it is provided that the core particles embedded in the polymer matrix have an average grain diameter of greater than 0.01 µm, preferably greater than 0.1, specifically greater than 0.8 µm. Alternatively or optionally in addition, the core particles have an average grain diameter of less than 1 µm, preferably less than 0.5 µm, specifically less than 0.05 µm. This embodiment is based on the aim of providing a powder that is distinguished by a particularly fine-grained portion of ceramic or metallic core particles and is suitable for electrophotography.

In an alternative or optionally additional embodiment of the present invention, it is provided that the composite particles have an average grain size of greater than 5 µm, preferably greater than 15 µm, specifically greater than 25 µm. Alternatively or optionally in addition, the composite particles have an average grain size of less than 30 µm, preferably less than 20 µm, specifically less than 10 µm. This embodiment is based on the aim of providing a powder that is suitable for electrophotography.

In a further specific realization, it is provided that the polymer has polymer as a principal portion, and has a charge control agent and/or a heat absorber as a secondary portion. In particular, the polymer is realized as ABS (acrylonitrile-butadiene-styrene copolymer). The charge control agent can be realized for example as zinc t-butylsalicylate. In particular, the charge control agent has a portion of greater than 0.1 wt % and/or less than 5 wt %. The heat absorber acts in particular to absorb infrared radiation. In particular, the heat absorber has a portion of greater than 0.05 wt % and/or less than 10 wt %. For reasons of simplicity, the term "polymer" is used for the described composition. This embodiment is based on the aim that the polymer used as binder be particularly easily removable and/or dissolvable, in addition making the core particles usable for electrophotography.

In a specific realization, it is provided that the first and the second constructive steps are carried out multiple times in succession. The application here takes place onto the previously applied blank segment in each case. In particular, the first and the second constructive steps are carried out until a complete geometry of the component has been built up. A plurality, and/or the plurality, of blank segments together form, in particular, a blank. The auxiliary structures applied in the plurality of constructive steps can have identical or different structures. In this way, at least two successive blank segments can have an identical or different geometry. In this way, on the one hand extruded geometries can be generated that, analogous to screen printing, have a continuous cross-sectional course. Alternatively, however, arbitrarily complex three-dimensional geometries can also be generated.

In a further realization of the present invention, it is provided that the method has a step of separation. In particular, the separating step takes place after the last constructive step. In the separating step, the auxiliary structure is removed from the blank and/or from the blank segment. The removal of the auxiliary structure is done for example by vaporization and/or dissolving of the component material. After the removal of the support material and/or of the auxiliary structure, a green compact is left over. The green compact in particular corresponds at least approximately to the shape of the component. Preferably, the green compact is made somewhat larger than the component, so that a loss of volume in the subsequent processing steps can be compensated. This embodiment is based on the aim that, through the dissolving and/or removal of the auxiliary structure, an image and/or green compact of the component can easily be produced, the green compact being made of the component material.

Particularly preferably, it is provided that the support material is water-soluble. Preferably, the component material is water-insoluble and/or media-insoluble, so that the component material is left over when the support material is dissolved. Preferably, the blank and/or the blank segment can be treated in a media bath, where only the support material dissolves and/or decomposes in the media bath. For example, the media bath is a water bath or a bath of an organic solvent.

Alternatively and/or in addition, the support material has a boiling point, a decomposition point, or a sublimation point that is lower than a melting temperature and/or a debinding temperature of the component material. Thus, the support material vaporizes when heated to the debinding temperature and/or melting temperature, and the component material is left over. For example, for this purpose the blank and/or the blank segment is irradiated and/or heated, the auxiliary structure being heated to above a decomposition temperature and/or vaporization temperature of the support material, and the support material being removed.

Particularly preferably, the method has a debinding step, where in the debinding step the polymer is dissolved out from the component material and a brown compact is formed. In particular, the debinding step takes place after the separating step. Preferably, the debinding is done using chemical and/or thermal extraction. For example, the debinding is done through a heating and/or irradiation of the component structure, so that the polymer is completely vaporized or partially evaporated. This embodiment is based on the aim of producing a component structure that is particularly stable in the later method, and is subject to few mechanical and/or thermal changes.

In a preferred realization, it is provided that the method has a solidification step. The solidification step is in particular also a sintering step. In the solidification step, the blank, the blank segment, the green compact, and/or the brown compact are sintered and/or solidified. For example, for this purpose the blank, the blank segment, the green compact, and/or the brown compact are heat-treated. In particular, in the solidification step the component material, in particular the core particles, are melted and/or sintered to one another. After the solidification step, a solid body is formed that in particular forms the component. This embodiment is based on the aim of providing a method by which a solid component having a complex geometry can be produced. Specifically, it can be provided that in the solidification step the dissolving and/or decomposition of the auxiliary structure also takes place. Here, the heat treatment in the solidification step is selected such that the decomposition temperature of the support material is exceeded.

The present invention further includes a manufacturing device for producing a component. In particular, the manufacturing device is designed to carry out the method as described above. The manufacturing device is a manufacturing device using additive manufacturing.

The manufacturing device has a first constructive unit. The first constructive unit is designed in particular to carry out the first constructive step. The first constructive unit is designed and/or suitable for applying the support material in order to form the auxiliary structure having intermediate spaces. The first constructive unit preferably has the photoreceptor roller, such that in particular the support material can be applied onto the bearer using the photoreceptor roller, using a photoelectric print method.

The manufacturing device has a second constructive unit, such that the component material is filled into the intermediate spaces of the auxiliary structure using the second constructive unit. The second constructive unit is in particular designed to carry out the second constructive step. The second constructive unit preferably has the additional photoreceptor roller, such that in particular the component material can be filled into the intermediate spaces using the additional photoreceptor roller, using a further photoelectric print method. This embodiment is based on the aim of providing a manufacturing device with which a complexly shaped component can be produced easily and at low cost, in particular due to the fact that both the auxiliary structures and the component structures can be generated using electrophotography.

In one example embodiment, it is provided that the manufacturing device has a debinding unit for debinding and/or pre-solidification of the component structure. In particular, the debinding unit is used for the debinding of the polymer from the component material and/or for the pre-solidification of the ceramic and/or metallic core particles of the component material. For example, the debinding unit is realized as an irradiation unit or as a thermal element. Using the debinding unit, the component structure, the blank segment of the green compact and/or the blank segment of the brown compact are heated and/or irradiated, so that the binder is at least partially vaporized and/or removed.

An alternative or optionally additional embodiment of the present invention provides that the manufacturing device has a solidification unit for solidifying and/or for sintering the component structure. In particular, the solidification unit is realized as an oven and/or as a thermal unit. Here, the component structure, the blank segment of the green compact, and/or the blank segment of the brown compact are for example heated by the solidification unit until the component material, in particular the core particles, are sintered together and/or melted together. The solidification unit is situated in the manufacturing device, preferably after the debinding unit, the debinding unit in turn preferably being situated after the two constructive units.

Optionally, the manufacturing device has a separating unit that is designed and/or suitable for separating and/or removing the auxiliary structure. In particular, the separating unit is designed to remove the auxiliary structure from the blank segment and/or from the blank. For example, the separating unit has a thermal element and/or an irradiating means for this purpose. Using the thermal element and/or the irradiating means, the blank segment and/or the blank can be heated in such a way that the first material and/or the auxiliary structure decompose, and/or the support material and/or the auxiliary structure are vaporized. The separating unit can also include a media basin, the blank segment and/or the blank being bathed in the media basin, the support material and/or the auxiliary structure dissolving in the media basin and/or in the medium.

Further advantages, effects, and embodiments of the present invention result from the Figures and their description herein.

BRIEF DESCRIPTION OF THE DRAWINGS

FIGS. 8a-8c schematically show various embodiments of composite particles of a component material.

DETAILED DESCRIPTION OF EXAMPLE EMBODIMENTS

Figure 1:
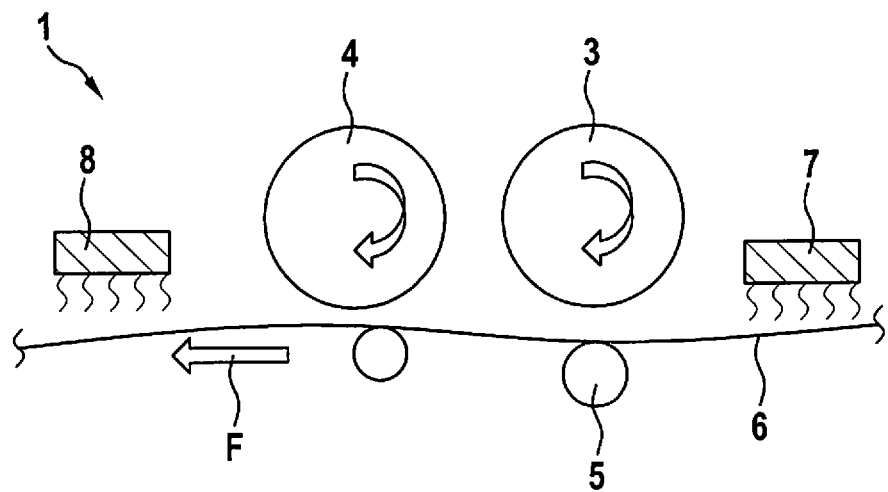
FIG. 1 shows an exemplary embodiment of a manufacturing device.

FIG. 1 shows a highly simplified schematic representation of a manufacturing device 1 as an exemplary embodiment of the present invention. Manufacturing device 1 is a device for the additive manufacturing of a component 2 (see FIG. 7). Manufacturing device 1 has a first constructive unit 3 and a second constructive unit 4, as well as a transport unit 5 for transporting a bearer 6. Bearer 6 is for example realized as a conveyor belt that is moved in a conveying direction F by transport unit 5. For example, bearer 6 is realized as a metallic bearer, in particular a metallic belt.

First constructive unit 3 is designed to carry out a first constructive step, and second constructive unit 4 is designed to carry out a second constructive step. Here, second constructive unit 4 immediately follows first constructive unit 3 in conveying direction F. The two constructive units 3, 4 are for example each formed by a separate photoreceptor roller and are designed to carry out a photoelectric printing method.

In addition, manufacturing device 1 has a heating unit 7 and a cooling unit 8. Heating unit 7 is situated before the two constructive units 3, 4, and cooling unit 8 is situated after the two cooling units 3, 4, in conveying direction F. Heating unit 7 is for example realized as a thermal element, e.g. an infrared radiating element. Bearer 6, or an already-applied part of component 2, is heated by heating unit 7, in particular in the vicinity of heating unit 7. For example, cooling unit 8 is realized as an air blower, bearer 6, or the already-applied part of the component, being cooled, in particular in the vicinity of cooling unit 8. Transport unit 5 transports bearer 6, bearer 6 being transported in conveying direction R from heating unit 7 to first constructive unit 3, to second constructive unit 4 and to cooling unit 8.

Figure 2:
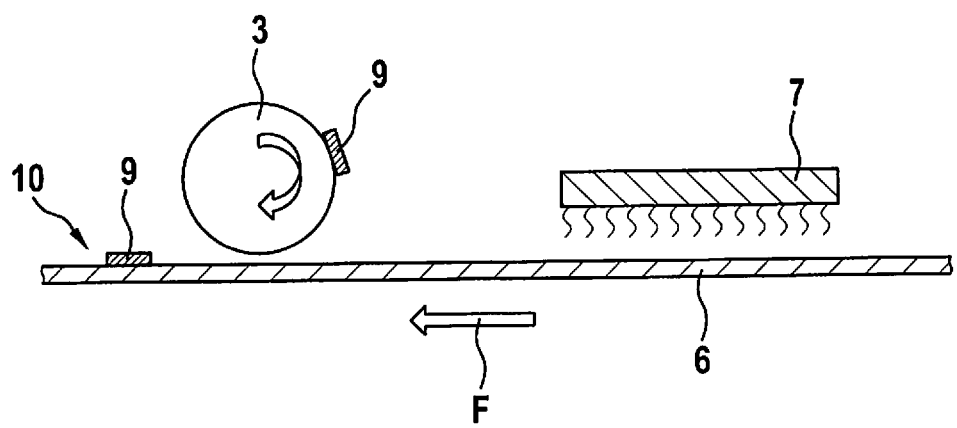
FIG. 2 shows an exemplary embodiment of a first constructive unit.

FIG. 2 shows a detail of manufacturing device 1 of FIG. 1, with first constructive unit 3 and heating unit 7. As mentioned above, heating unit 7 heats the segment of bearer 6 that runs through this segment. First constructive unit 3 is rotated in a direction of rotation R, direction of rotation R being selected such that it runs parallel to direction of transport F at a closest point.

A support material 9 is applied onto bearer 4 by first constructive unit 3. For this purpose, first constructive unit 3, realized as a photoreceptor roller, is for example electrically charged and subsequently exposed in segments, the exposed areas thus being discharged. Subsequently, photoreceptor roller 3 is brought into contact with support material 9, support material 9 adhering to the charged segments of photoreceptor roller 3. Subsequently, support material 9, adhering to photoreceptor roller 3, is transferred to the heated segment of bearer 6 through electrical interaction with bearer 6, in order to form an auxiliary structure 10. For this purpose, it can for example be provided that bearer 6 is also charged in this segment, in order in this way to reinforce the interaction between bearer 6 and support material 9. Auxiliary structure 10 is formed by solid segments of support material 9 on bearer 6. Here auxiliary structure 10 is situated such that it forms a positive, and/or an external molding, of component 2 that is to be produced.

Figure 3:
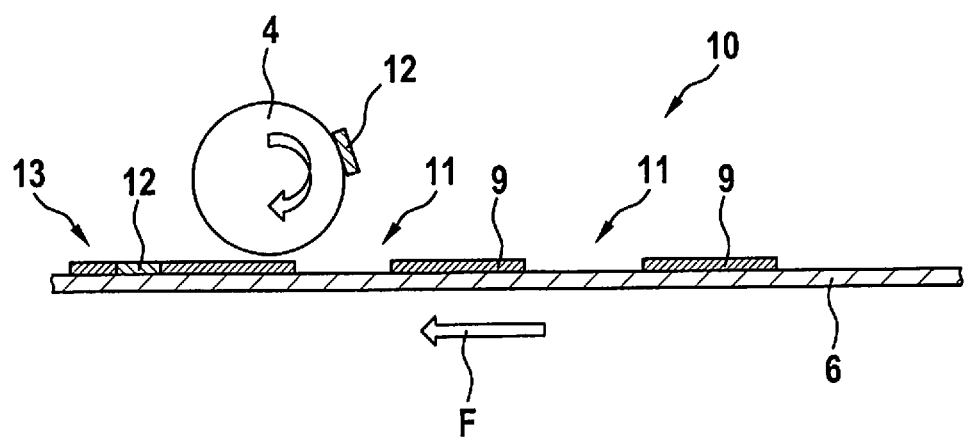
FIG. 3 shows an exemplary embodiment of a second constructive unit.

FIG. 3 shows another detail of manufacturing device 1 of FIG. 1. Here, second constructive unit 4 is shown, situated after first constructive unit 3 in conveying direction F. The segments and/or applications of auxiliary structure 10 can be realized with different sizes and/or different lengths, and can be separated from one another by interposed intermediate spaces 11. Intermediate spaces 11 in particular form a partial segment and/or a partial geometry of component 2 that is to be produced.

Second constructive unit 2, realized as a further photoreceptor roller, is also electrostatically charged. Through exposure of the further photoreceptor roller 4, this roller can be partially neutralized, and subsequently a component material 12 can be applied. Here, the component material 12 applied onto further photoreceptor roller 4 is applied in such a way that it corresponds to the intermediate spaces 11 of auxiliary structure 10. Component material 12 situated on further photoreceptor roller 4 is filled into intermediate spaces 11 as a component structure 13. The transfer takes place in such a way that further photoreceptor roller 4 rotates in a direction of rotation R, and during the rotation component material 12 is transferred into intermediate spaces 11 through electrical interaction. In this way, second constructive unit 4 is realized so as to fill intermediate spaces 11 of auxiliary structure 10 with component material 12.

Figure 4A:
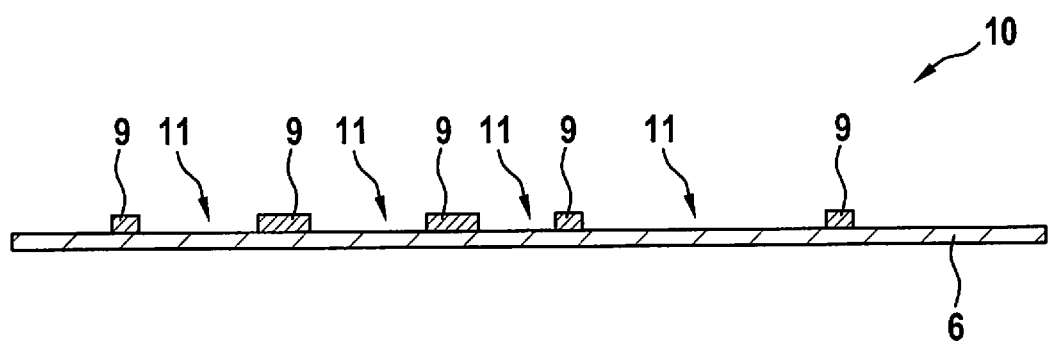
FIGS. 4a-4d show examples of the coating of a plurality of blank segments.

FIGS. 4a, 4b, 4c, and 4d schematically show the sequence of the method. In FIG. 4a, in a first constructive step support material 9 is applied onto bearer 6, in the form of auxiliary structure 10. The application of support material 9 here takes place using a photoelectric print method. Support material 9 is realized as a polymer, in particular as a water-soluble polymer. Here, auxiliary structure 10 has intermediate spaces 11 that are realized having different sizes. Auxiliary structure 10 and/or intermediate spaces 11 reproduce the shape of component 2 that is to be produced, in particular in a cross-section.

Figure 4B:
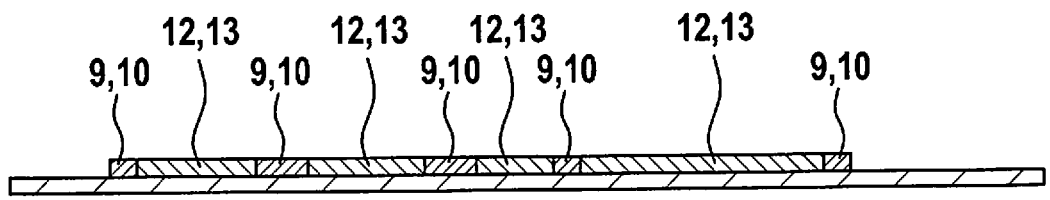

In FIG. 4b, in the second constructive step component material 12 was filled into intermediate spaces 11, on bearer 6, in order to form component structure 13, auxiliary structure 10 forming, together with component structure 13, a blank segment 14a. In particular, component structure 13 fills intermediate spaces 11 completely. The application of component material 12 is done here using a further photoelectric print method.

Figure 4C:
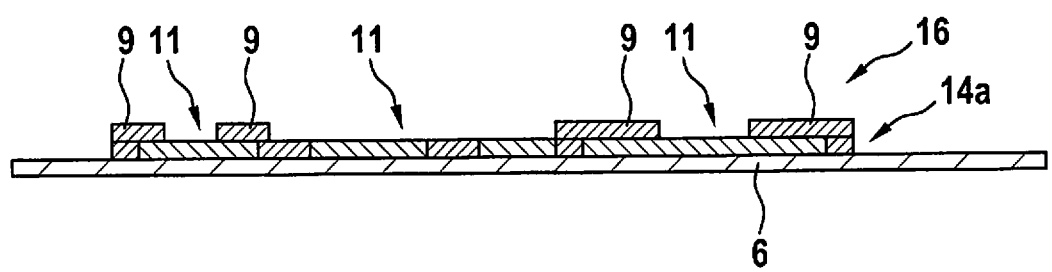
Figure 4D:
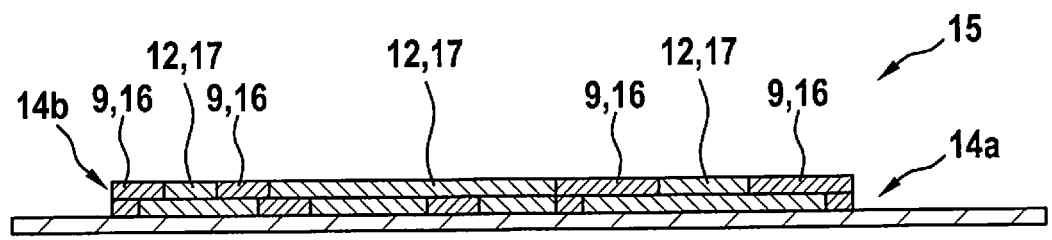

FIGS. 4c and 4d show the application of a further blank segment 14b onto the already-present blank segment 14a. For this purpose, as shown in FIG. 4b, a further layer of support material 9 is applied onto the previously applied blank segment 14a as a further auxiliary structure 16, using the photoelectric print method. Here, the further applied auxiliary structure 16 has a different geometrical structure than does the previously applied auxiliary structure 10. Here as well, intermediate spaces 11 are again provided.

Subsequently, the intermediate spaces 11 are again filled with component material 12 in order to form a further component structure 17, using the further photoelectric print method, the further applied auxiliary structure 16, together with further component structure 17, forming further blank segment 14b. For example, the two blank segments 14a, b can together form a blank 15. Alternatively, however, it can also be provided that additional constructive steps follow, so that a plurality of blank segments 14a, b are applied, and in this way blank 15 is produced.

Figure 5:
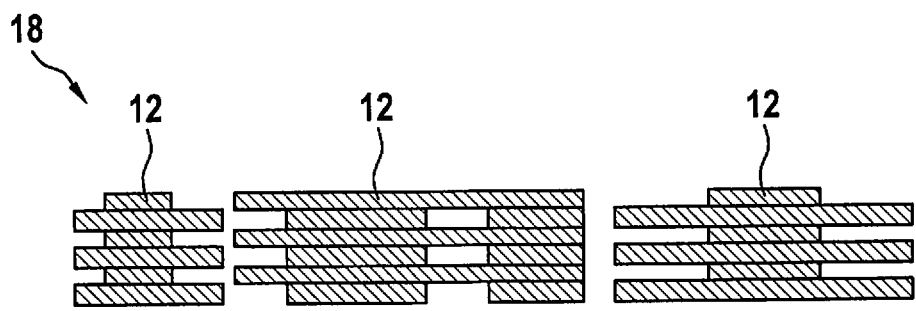
FIG. 5 shows an exemplary embodiment of a green compact.

FIG. 5 shows a green compact 18, having in particular the shape and/or contour of component 2. Green compact 18 is made of component material 12, the above-described auxiliary structures 10, 16 having been dissolved out from blank 18 in a separating step. For this purpose, blank 15 was for example immersed in a medium basin filled with a solvent, e.g. water, support material 9 dissolving and only the segments of component material 12 being left over. As a result, from blank 18, due to the detachment and/or dissolving, or decomposition, of support material 9, there results green compact 18 of component 2.

Figure 6:
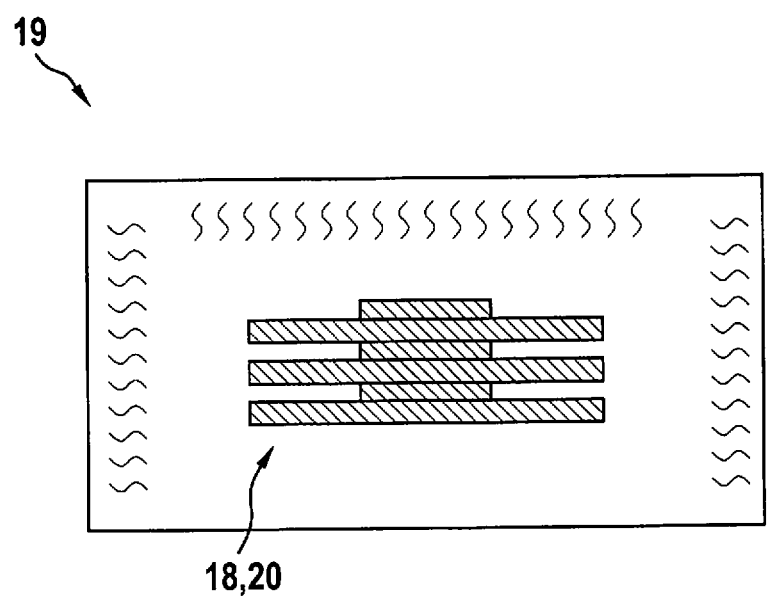
FIG. 6 shows an exemplary embodiment of a solidification unit.

FIG. 6 shows a schematic representation of a solidification unit 19 that in particular is a part of manufacturing device 1. Solidification unit 19 is realized as an oven. Green compact 18 is thermally treated in solidification unit 19 in order to produce component 2. For example, in a first step green compact 18 can be heated until a thermal debinding of component material 12 takes place and a brown compact 20 is formed. In this way, solidification unit 19 can for example at the same time act as a debinding unit. Subsequently, the temperature and/or the pressure inside solidification unit 19 is further increased, so that green compact 18, or brown compact 20, is sintered and/or melted. From the sintered and/or melted green compact 18, or brown compact 19, component 2 is in this way formed. In particular, a reduction in volume of green compact 18 takes place during the solidification and/or during the sintering.

Figure 7:
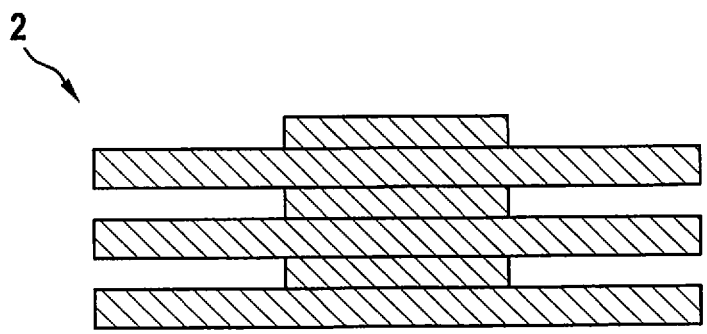
FIG. 7 shows an exemplary embodiment of a component.

FIG. 7 shows component 2 as obtained from green compact 18 in the solidification step. The geometry and/or contour of component 2 here corresponds to the geometry and/or the contour of green compact 18; however, component 2 may be shrunk and/or reduced in size relative to green compact 18.

Figure 8A:
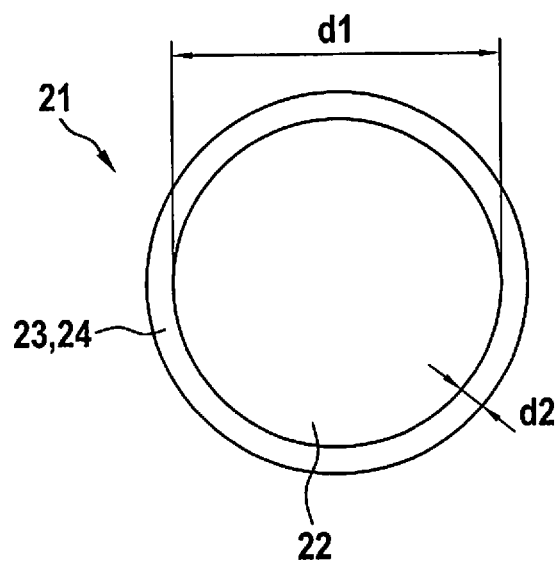

FIGS. 8a, 8b, and 8c show, in a highly schematic representation, various specific embodiments of individual composite particles 21 of component material 12 described above. Component material 12 is for example realized as a metallic powder, the composite particles 21 having metallic core particles 22 for this purpose. Core particles 22 can for example be aluminum particles and/or steel particles.

In addition, composite particles 21 have a non-conductive polymer 23 that is suitable for electrophotography. Polymer 23 preferably here has material properties differing from those of the polymer used for support material 9, so that polymer 23 is resistant to the solvent, in particular during the separation step. Polymer 23 here adheres to core particles 22, so that composite particles 21, in particular component material 12, have a conductivity and/or melting temperature that is improved for the electrophotography.

In FIG. 8a, polymer 23 forms a polymer layer 24, each of the core particles 22 being coated with polymer layer 24. For example, core particles 22 are completely covered, or sheathed, by polymer layer 24. For example, core particles 22 have an average grain size d1 of at least 1 µm, in particular greater than 20 µm. Polymer layer 24 can have a layer thickness d2 of at least 1 µm, in particular greater than 5 µm.

In FIG. 8b, polymer 23 forms a plurality of separate polymer particles 25 that each adhere to a particle surface of core particles 22. Polymer particles 25 can be anchored mechanically or chemically to core particle 22. Here, the number of adhering polymer particles 25 is greater than one. Polymer particles 25 can be configured so as to be arbitrarily distributed on the particle surface of core particles 22. Core particles 22 have for example an average grain size d1 of at least 1 µm, in particular greater than 20 µm. Polymer particles 25 have for example an average grain size d3 of at least 1 µm, in particular greater than 5 µm.

In FIG. 8c, polymer 23 forms a polymer matrix 26, a plurality of core particles 22 being at least partly bound in the manner of a matrix in polymer matrix 26. Core particles 22 are configured so as to be at least approximately uniformly distributed in polymer matrix 26. Core particles 22 have for example an average grain size d1 of at least 0.01 µm, in particular greater than 0.2 µm. Ideally, composite particles 21 have a resulting average particle size D50 of at least 5 µm, in particular greater than 20 µm.

What is claimed is:

1. A method for producing a component, comprising the following steps:
   in a first constructive step, providing at least one auxiliary structure, the auxiliary structure including a support material on a bearer, the auxiliary structure having and/or forming intermediate spaces;

in a second constructive step, filling a component material into the intermediate spaces using a photoelectric print method to form a component structure, the auxiliary structure and the component structure forming a blank segment of the component;

wherein the component material is a powder, the powder including composite particles, the composite particles being formed by ceramic and/or metallic core particles, and the composite particles including a polymer.

2. The method as recited in claim 1, wherein the first constructive step further includes applying the support material onto the bearer using a further photoelectric print method for form the at least one auxiliary structure.

3. The method as recited in claim 1, wherein the polymer forms a polymer layer, the core particles being coated with the polymer layer completely or at least in some segments.

4. The method as recited in claim 1, wherein the polymer forms separate polymer particles, a plurality of the polymer particles being attached to one of the core particles in each case.

5. The method as recited in claim 3, wherein:
the core particles have an average grain diameter of greater than 1 μm and/or less than 30 μm, and/or
the polymer layer has a layer thickness of greater than 1 μm and/or less than 10 μm.

6. The method as recited in claim 4, wherein the polymer particles have an average grain diameter of greater than 1 μm and/or less than 10 μm.

7. The method as recited in claim 1, wherein the polymer forms a polymer matrix, a plurality of the core particles being embedded in the polymer matrix.

8. The method as recited in claim 7, wherein the core particles have an average grain diameter of greater than 0.01 μm and/or less than 1 μm.

9. The method as recited in claim 1, wherein the composite particles have an average grain size of greater than 5 μm and/or less than 30 μm.

10. The method as recited in claim 1, wherein the polymer has polymer as a principal component and has, as a secondary component, a charge control agent and/or a heat absorber.

11. The method as recited in claim 2, wherein, through multiple carrying out of the first and of the second constructive step, a blank is formed from a plurality of blank segments, such that subsequent blank segment of the plurality of blank segments in each case can have a geometry identical to or different from a preceding one of the plurality of blank segments.

12. The method as recited in claim 1, further comprising the following step:
a separating step including removing the auxiliary structure and/or the bearer from the blank segment through vaporization and/or dissolving of the support material, a green compact being formed in the separating step.

13. The method as recited in claim 11, further comprising the following step:
a separating step including removing the auxiliary structure and/or the bearer from the blank through vaporization and/or dissolving of the support material, a green compact being formed in the separating step.

14. The method as recited in claim 1, wherein the support material is water-soluble and/or has a boiling point lower than a melting temperature of the component material.

15. The method as recited in claim 1, further comprising the following step:
a debinding step, the polymer being dissolved out from the component material, and a brown compact being formed, in the debinding step.

16. The method as recited in claim 11, further comprising the following step:
a solidification step, including sintering and/or solidifying the blank, and the component being formed in the solidification step.

17. The method as recited in claim 1, further comprising the following step:
a solidification step, including sintering and/or solidifying the blank segment, and the component being formed, in the solidification step.

18. The method as recited in claim 12, further comprising the following step:
a solidification step, including sintering and/or solidifying the green compact, and the component being formed in the solidification step.

19. The method as recited in claim 15, further comprising the following step:
a solidification step, including sintering and/or solidifying the brown compact, and the component being formed in the solidification step.

* * * * *